(12) United States Patent
Castinado

(10) Patent No.: US 11,257,139 B2
(45) Date of Patent: Feb. 22, 2022

(54) PHYSICAL NEEDS TOOL

(71) Applicant: BANK OF AMERICA CORPORATION, Charlotte, NC (US)

(72) Inventor: Joseph B. Castinado, Northglenn, CO (US)

(73) Assignee: Bank of America Corporation, Charlotte, NC (US)

( * ) Notice: Subject to any disclaimer, the term of this patent is extended or adjusted under 35 U.S.C. 154(b) by 154 days.

(21) Appl. No.: 16/553,385

(22) Filed: Aug. 28, 2019

(65) Prior Publication Data

US 2021/0065274 A1    Mar. 4, 2021

(51) Int. Cl.
| | | |
|---|---|---|
| G06Q 30/06 | (2012.01) | |
| G06F 17/15 | (2006.01) | |
| G01W 1/10 | (2006.01) | |
| G06F 16/9035 | (2019.01) | |
| G06Q 10/02 | (2012.01) | |

(52) U.S. Cl.
CPC .......... *G06Q 30/0631* (2013.01); *G01W 1/10* (2013.01); *G06F 16/9035* (2019.01); *G06F 17/15* (2013.01); *G06Q 10/02* (2013.01); *G06Q 30/0635* (2013.01)

(58) Field of Classification Search
USPC ....................................................... 705/26.7
See application file for complete search history.

(56) References Cited

U.S. PATENT DOCUMENTS

| | | |
|---|---|---|
| 6,288,646 B1 | 9/2001 | Skardon |
| 6,954,736 B2 | 10/2005 | Menninger et al. |
| 7,039,606 B2 | 5/2006 | Hoffman et al. |
| 7,054,837 B2 | 5/2006 | Hoffman et al. |
| 7,072,843 B2 | 7/2006 | Menninger et al. |
| 7,072,886 B2 | 7/2006 | Salmenkaita et al. |
| 7,089,216 B2 | 8/2006 | Van Overveld |
| 7,120,596 B2 | 10/2006 | Hoffman et al. |
| 7,129,825 B2 | 10/2006 | Weber |
| 7,162,444 B1 | 1/2007 | Machado, Jr. et al. |
| 7,171,379 B2 | 1/2007 | Menninger et al. |

(Continued)

OTHER PUBLICATIONS

J. Tong, H. Ma, W. Liu and B. Wang, "Time and location-based hybrid recommendation system," 2017 IEEE 2nd International Conference on Big Data Analysis (ICBDA), 2017, pp. 677-683, doi: 10.1109/ICBDA.2017.8078721 (Year: 2017).*

*Primary Examiner* — Michelle T Kringen

(57) ABSTRACT

An apparatus includes a database, memory, and processor. The database stores a purchase history, assigned to a user, that includes records of products and a ticket for travel to a second location on a first date. The memory stores categories, each of which is assigned to weather conditions and includes products for which a positive correlation exists between consumer demand and a presence of one or more weather conditions. The processor determines that the user will be in the second location on a third date and obtains a predicted weather condition at the second location on the third date. The weather condition is assigned to a category including a product. The processor determines that a probability the user has a need for the product is greater than a threshold and sends a product recommendation to the user. The processor receives a purchase request from the user and completes a purchase.

20 Claims, 4 Drawing Sheets

(56) References Cited

U.S. PATENT DOCUMENTS

| | | |
|---|---|---|
| 7,184,965 B2 | 2/2007 | Fox et al. |
| 7,373,318 B2 | 5/2008 | Kutsumi et al. |
| 7,529,639 B2 | 5/2009 | Räsänen et al. |
| 7,752,106 B1 | 7/2010 | Corby et al. |
| 7,958,006 B2 | 7/2011 | Pinckney et al. |
| 8,032,480 B2 | 10/2011 | Pinckney et al. |
| 8,068,858 B2 | 11/2011 | Werner et al. |
| 8,606,636 B1 | 12/2013 | Keoshkerian |
| 8,655,829 B2 | 2/2014 | Flinn et al. |
| 8,666,909 B2 | 3/2014 | Pinckney et al. |
| 8,671,068 B2 | 3/2014 | Harber et al. |
| 8,996,530 B2 | 3/2015 | LuVogt et al. |
| 9,159,034 B2 | 10/2015 | Pinckney et al. |
| 9,172,915 B2 | 10/2015 | Nicholas et al. |
| 9,765,562 B2 | 9/2017 | Hatch |
| 9,858,610 B2 | 1/2018 | Goulart |
| 10,062,066 B2 * | 8/2018 | Cancro ............... G06Q 20/3274 |
| 10,081,525 B2 | 9/2018 | High et al. |
| 10,115,158 B2 | 10/2018 | Lindores |
| 10,318,534 B2 | 6/2019 | Pinckney et al. |
| 10,380,425 B2 * | 8/2019 | Wexler .................... G06F 3/017 |
| 2002/0169682 A1 * | 11/2002 | Capek ................ G06Q 30/0641 |
| | | 705/26.8 |
| 2003/0064350 A1 | 4/2003 | Rubinstenn et al. |
| 2003/0065525 A1 | 4/2003 | Giacchetti et al. |
| 2006/0015360 A1 | 1/2006 | Ochs et al. |
| 2008/0091570 A1 * | 4/2008 | Cella .................. G06Q 30/0611 |
| | | 705/27.1 |
| 2008/0154655 A1 * | 6/2008 | Hartmann .......... G06Q 30/0601 |
| | | 705/5 |
| 2009/0216547 A1 | 8/2009 | Canora et al. |
| 2009/0239552 A1 | 9/2009 | Churchill et al. |
| 2011/0302050 A1 | 12/2011 | Kildevaeld |
| 2012/0310407 A1 * | 12/2012 | De La Rue ............... G07F 9/02 |
| | | 700/225 |
| 2013/0129210 A1 | 5/2013 | Na |
| 2013/0211875 A1 * | 8/2013 | Milman ............ G06Q 30/0201 |
| | | 705/7.29 |
| 2014/0067745 A1 | 3/2014 | Avey et al. |
| 2014/0130076 A1 | 5/2014 | Moore et al. |
| 2014/0195272 A1 | 7/2014 | Sadiq et al. |
| 2015/0287191 A1 | 10/2015 | Koruga et al. |
| 2017/0262698 A1 | 9/2017 | Hoffman et al. |
| 2017/0287044 A1 | 10/2017 | Rose et al. |
| 2019/0172119 A1 * | 6/2019 | Craft .................. G06Q 30/0207 |
| 2020/0160381 A1 * | 5/2020 | Nagar ................ G06Q 30/0252 |
| 2020/0201346 A1 * | 6/2020 | Jin ....................... G05D 1/0229 |
| 2020/0219055 A1 * | 7/2020 | Nagar ................ G06Q 30/0283 |

* cited by examiner

PHYSICAL NEEDS TOOL

TECHNICAL FIELD

This disclosure relates generally to data storage, management, and use and, more particularly, to leveraging big data to provide for an individual's physical needs.

BACKGROUND

Recent technological breakthroughs have substantially reduced data storage costs and provided for increased computational power. Such breakthroughs have enabled organizations to capture and store vast quantities of information generated by individuals who are increasingly conducting large portions of their daily lives while connected to the Internet.

SUMMARY

Recent technological breakthroughs have substantially reduced data storage costs and provided for increased computational power. Such breakthroughs have enabled organizations to capture and store vast quantities of information generated by individuals who are increasingly conducting large portions of their daily lives while connected to the Internet. For example, individuals often purchase products and plan for travel online, navigate between locations with the aid of GPS-enabled and internet-connected mobile devices, use social media to connect with other individuals online, and employ various IoT (Internet of Things) devices for a multitude of different purposes.

Given the increasing complexity of individuals' daily lives, it may be possible to use this wealth of "big data" to extract more information about and/or affecting a given individual than the individual himself/herself may be aware. As an example, an individual traveling in May from Texas to Colorado may be unaware that a cold front is expected to arrive in Colorado on the day of the individual's arrival. Without this information, the individual, who may not even own appropriate winter apparel, may arrive in Colorado without having packed suitable protection from the elements, putting himself/herself in danger of physical harm, and perhaps even death. However, given that the individual likely purchased his/her ticket to Colorado online, data associated with this purchase may be coupled with weather forecast information to determine that the individual is likely to encounter unseasonably cold temperatures on the day of his/her arrival. This information, coupled with information about the individual's past purchases (potentially indicating an absence of winter clothing purchases), may suggest that the individual likely has a need for a winter jacket on his/her trip.

As another example, an individual on vacation in Hawaii may be unaware that the first major snow storm of the season is expected to hit the individual's home town shortly after his/her return from vacation. Because of his absence from the region, the individual may not have purchased any supplies he/she may need during and/or after the storm. For example, while the individual may have purchased a snow shovel years ago, the shovel may have broken during the previous winter and the individual may not have replaced it. Without a functioning snow shovel, the individual's car may become trapped under piles of snow, preventing the individual from accessing it in the event of an emergency. As another example, the storm may be severe enough such that large portions of the individual's town may experience a loss of power. While the individual may have a personal generator to deal with such situations, the individual may not have purchased replacement fuel for the generator since the last time he/she used it. This may put the individual at risk of freezing to death. As a further example, the individual may not have a current supply of road salt or other de-icing agent that he/she can place on his/her walkways. This may leave the walkways dangerously icy, which may cause the individual to slip and fall, leaving him/her seriously injured. At the same time, data associated with the individual's trip may be combined with the weather forecast for the individual's home town and the individual's past purchases to determine that the individual may have a need for one or more products, such as a snow shovel, generator fuel, and/or road salt, upon his/her return.

This disclosure contemplates a physical needs tool designed to address these and related situations. The tool leverages data collected from a user's travel purchases to determine future locations of the user. The tool combines this information with available weather forecasts to determine the weather at the user's future locations. Based on historical purchases made by both the user and other users, the tool determines products which the user may need at one or more of the user's future locations, taking into account the weather predicted at these future locations. Examples of such products may include snow shovels, winter jackets, road salt, emergency candles, umbrellas, rain boots, sunscreen, hats, etc. The tool presents recommendations of these products to the user, prior to the user arriving at the future locations, where the products may be needed. Through the recommendation messages, the user may complete purchases of the products. This helps to ensure that the products are available to the user at the user's future locations, where they may be used by the user. In this manner, one or more embodiments of the tool help to provide for a user's physical needs, helping to protect the user from suffering serious injuries or even death. Certain embodiments of the physical needs tool are described below.

According to one embodiment, an apparatus includes a database, a memory, and a hardware processor communicatively coupled to the memory. The database stores a first purchase history. The first purchase history is assigned to a first user and includes one or more records of products purchased by the first user as well as a record of a ticket purchased by the first user. The ticket is for travel from a first location to a second location on a first date and from the second location back to the first location on a second date. The memory stores a set of weather categories. Each weather category of the set of weather categories is assigned to one or more weather conditions and includes one or more products. For each product of the one or more products, a positive correlation exists between consumer demand for the product, and a presence of at least one of the one or more weather conditions at the given location and on the given date that the product was purchased. The processor determines, based on the first purchase history assigned to the first user, that the first user will be in the second location on a third date. In response to determining that the first user will be in the second location on the third date, the processor obtains a prediction of a first weather condition at the second location on the third date. The processor further determines that the first weather condition is assigned to a first weather category of the set of weather categories. The first weather category includes a first product. The processor additionally determines, based on the one or more records of products purchased by the first user, a probability that the first user has a need for the first product. Determining the probability that the first user has the need for the first product includes determining that the first purchase history of the first user does not include a first record of the first product purchased by the first user, or determining that the first purchase history of the first user does include the first record of the first product purchased by the first user and determining a second probability that the purchased first product is expired. The processor further determines that the probability that the first user has the need for the first product is greater than a threshold. In response to determining that the probability is greater than the threshold, the processor sends a recommendation of the first product to the first user. The recommendation includes a link to purchase the first product from an online retailer. In response to sending the recommendation of the first product to the first user, the processor receives a response from the first user. The response includes a purchase request. In response to receiving the response, the processor completes a purchase of the first product for the first user.

According to another embodiment, a method includes locating a record of a ticket purchased by a first user in a first purchase history assigned to the first user. The first purchase history includes one or more records of products purchased by the first user and the record of the ticket purchased by the first user. The ticket is for travel from a first location to a second location on a first date and from the second location back to the first location on a second date. The method further includes determining, based on the record of the ticket, that the first user will be in the second location on a third date. In response to determining that the first user will be in the second location on the third date, the method includes obtaining a prediction of a first weather condition at the second location on the third date. The method also includes determining that the first weather condition is assigned to a first weather category of a set of weather categories. Each weather category of the set of weather categories is assigned to one or more weather conditions and includes one or more products. For each product of the one or more products, a positive correlation exists between consumer demand for the product and a presence of at least one of the one or more weather conditions at a given location and on a given date that the product was purchased. The method additionally includes determining that the first weather category includes a first product. The method also includes determining, based on the one or more records of products purchased by the first user, a probability that the first user has a need for the first product. Here, determining the probability that the first user has the need for the first product includes determining that the first purchase history of the first user does not includes a first record of the first product purchased by the first user or determining that the first purchase history of the first user does include the first record of the first product purchased by the first user and determining a second probability that the purchased first product is expired. The method further includes determining that the probability that the first user has the need for the first product is greater than a threshold. In response to determining that the probability is greater than the threshold, the method includes sending a recommendation of the first product to the first user. The recommendation includes a link to purchase the first product from an online retailer. In response to sending the recommendation of the first product to the first user, the method includes receiving a response from the first user. The response includes a purchase request. In response to receiving the response, the method includes completing a purchase of the first product for the first user.

According to a further embodiment, a system includes a first storage element, a second storage element, and a processing element communicatively coupled to the second storage element. The first storage element is operable to store a first purchase history assigned to a first user. The first purchase history includes one or more records of products purchased by the first user and a record of a ticket purchased by the first user. The ticket is for travel from a first location to a second location on a first date and from the second location back to the first location on a second date. The second storage element is operable to store a set of weather categories. Each weather category of the set of weather categories is assigned to one or more weather conditions and includes one or more products. For each product of the one or more products, a positive correlation exists between consumer demand for the product, and a presence of at least one of the one or more weather conditions at a given location and on a given date that the product was purchased. The processing element is operable to determine, based on the first purchase history assigned to the first user, that the first user will be in the second location on a third date. In response to determining that the first user will be in the second location on the third date, the processing element is operable to obtain a prediction of a first weather condition at the second location on the third date. The processing element is further operable to determine that the first weather condition is assigned to a first weather category of the set of weather categories. The first weather category includes a first product. The processing element is additionally operable to determine, based on the one or more records of products purchased by the first user, a probability that the first user has a need for the first product. Here, determining the probability that the first user has the need for the first product includes determining that the first purchase history of the first user does not include a first record of the first product purchased by the first user or determining that the first purchase history of the first user does include the first record of the first product purchased by the first user and determining a second probability that the purchased first product is expired. The processing element is also operable to determine that the probability that the first user has the need for the first product is greater than a threshold. In response to determining that the probability is greater than the threshold, the processing element is operable to send a recommendation of the first product to the first user. The recommendation includes a link to purchase the first product from an online retailer. In response to sending the recommendation of the first product to the first user, the processing element is operable to receive a response from the first user. The response includes a purchase request. In response to receiving the response, the processing element is operable to complete a purchase of the first product for the user. Here, completing the purchase of the first product for the first user includes providing the online retailer with payment information of the first user and the second location. This embodiment contemplates that in response to receiving the payment information and the second location the online retailer ships the first product to the second location.

Certain embodiments provide one or more technical advantages. For example, an embodiment helps to provide for a user's physical needs while traveling, by helping to ensure that the user is equipped with products designed to provide for the user's safety and/or comfort during various weather conditions at the user's locations of travel. As another example, an embodiment may protect a user from serious injury or even death. As another example, an embodiment uses a user's past purchases to determine those products a user may wish to purchase, along with predicting those versions of the products that the user is most likely to purchase, saving bandwidth and processing resources that may otherwise be expended by a user searching for suitable product versions, and helping to ensure that the products are available for the user when needed. As a further example, an embodiment may track a user's past purchases and predict when the purchased products will expire, presenting the user with a recommendation to purchase replacement products, so that the user has functioning products when a need for them arises. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
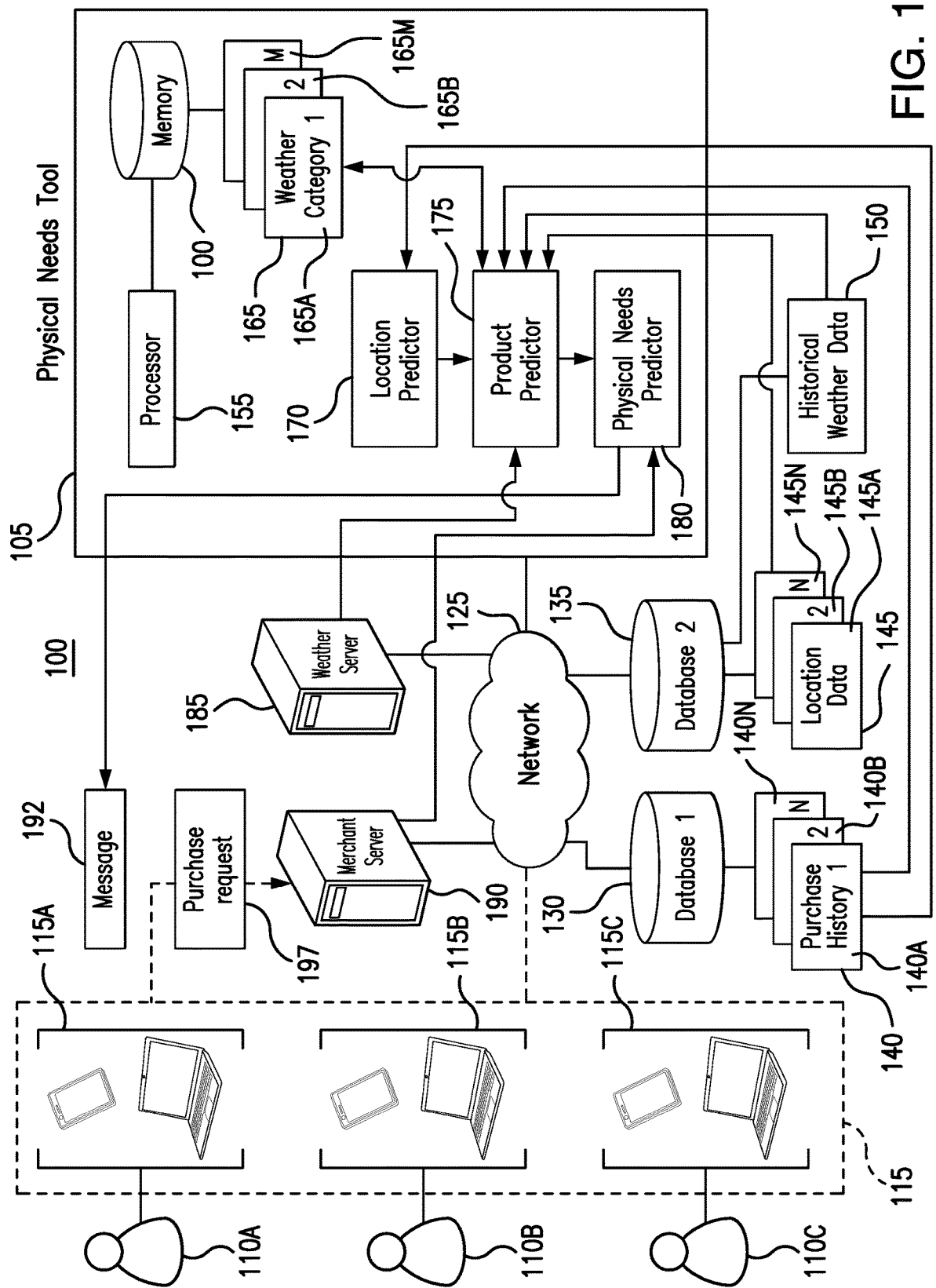
FIG. 1 illustrates an example system.

Embodiments of the present disclosure and its advantages are best understood by referring to FIGS. 1 through 4 of the drawings, like numerals being used for like and corresponding parts of the various drawings.

Recent technological breakthroughs have substantially reduced data storage costs and provided for increased computational power. Such breakthroughs have enabled organizations to capture and store vast quantities of information generated by individuals who are increasingly conducting large portions of their daily lives while connected to the Internet. For example, individuals often purchase products and plan for travel online, navigate between locations with the aid of GPS-enabled and internet-connected mobile devices, use social media to connect with other individuals online, and employ various IoT (Internet of Things) devices for a multitude of different purposes.

Given the increasing complexity of individuals' daily lives, it may be possible to use this wealth of "big data" to extract more information about and/or affecting a given individual than the individual himself/herself may be aware. As an example, an individual traveling in May from Texas to Colorado may be unaware that a cold front is expected to arrive in Colorado on the day of the individual's arrival. Without this information, the individual, who may not even own appropriate winter apparel, may arrive in Colorado without having packed suitable protection from the elements, putting himself/herself in danger of physical harm, and perhaps even death. However, given that the individual likely purchased his/her ticket to Colorado online, data associated with this purchase may be coupled with weather forecast information to determine that the individual is likely to encounter unseasonably cold temperatures on the day of his/her arrival. This information, coupled with information about the individual's past purchases (potentially indicating an absence of winter clothing purchases), may suggest that the individual likely has a need for a winter jacket on his/her trip.

As another example, an individual on vacation in Hawaii may be unaware that the first major snow storm of the season is expected to hit the individual's home town shortly after his/her return from vacation. Because of his absence from the region, the individual may not have purchased any supplies he/she may need during and/or after the storm. For example, while the individual may have purchased a snow shovel years ago, the shovel may have broken during the previous winter and the individual may not have replaced it. Without a functioning snow shovel, the individual's car may become trapped under piles of snow, preventing the individual from accessing it in the event of an emergency. As another example, the storm may be severe enough such that large portions of the individual's town may experience a loss of power. While the individual may have a personal generator to deal with such situations, the individual may not have purchased replacement fuel for the generator since the last time he/she used it. This may put the individual at risk of freezing to death. As a further example, the individual may not have a current supply of road salt or other de-icing agent that he/she can place on his/her walkways. This may leave the walkways dangerously icy, which may cause the individual to slip and fall, leaving him/her seriously injured. At the same time, data associated with the individual's trip may be combined with the weather forecast for the individual's home town and the individual's past purchases to determine that the individual may have a need for one or more products, such as a snow shovel, generator fuel, and/or road salt, upon his/her return.

This disclosure contemplates a physical needs tool designed to address these and related situations. The tool leverages data collected from a user's travel purchases to determine future locations of the user. The tool combines this information with available weather forecasts to determine the weather at the user's future locations. Based on historical purchases made by both the user and other users, the tool determines products which the user may need at one or more of the user's future locations, taking into account the weather predicted at these future locations. Examples of such products may include snow shovels, winter jackets, road salt, emergency candles, umbrellas, rain boots, sunscreen, hats, etc. The tool presents recommendations of these products to the user, prior to the user arriving at the future locations, where the products may be needed. Through the recommendation messages, the user may complete purchases of the products. This helps to ensure that the products are available to the user at the user's future locations, where they may be used by the user. In this manner, one or more embodiments of the tool help to provide for a user's physical needs, helping to protect the user from suffering serious injuries or even death. The physical needs tool will be described in more detail using FIGS. 1 through 4.

FIG. 1 illustrates an example system 100. As seen in FIG. 1, system 100 includes physical needs tool 105, one or more devices 115, network 125, first database 130, second database 135, weather server 185, and merchant server 190. Generally, physical needs tool 105 searches a purchase history 140A assigned to a user 110A to determine that user 110A will be at a given location, on a future date. For example, purchase history 140A may contain a record of a plane ticket purchased for travel from a first location to a second location on a first date and travel back to the first location from the second location on a second date. Physical needs tool 105 may then obtain a weather forecast for the given location and date from weather server 185, and determine a set of products typically purchased by other users 110B through 110C during a set of weather conditions that include the forecasted weather. For example, if the weather forecast calls for snow, physical needs tool 105 may determine a set of products that includes a snow shovel, a winter coat, a pair of gloves, and road salt, among others. As another example, if the weather forecast calls for unseasonably warm temperatures, physical needs tool 105 may determine a set of products that includes a bathing suit, sunglasses, a hat, and sunscreen, among others. Physical needs tool 105 then determines whether user 110A may have a need for any of the products of the set of products typically purchased during weather conditions that include the forecasted weather, based on purchase history 140A of user 110A. In certain embodiments, physical needs tool 105 determines that user 110A may have a need for a product of the set of products based on the absence of a purchase of the product in the user's purchase history 140A. In certain embodiments in which a purchase of the product is present in the user's purchase history 140A, physical needs tool 105 may determine that user 110A may have a need for the product based in part on a determination that the time interval since the product last appeared in purchase history 140A suggests that the purchased product is now expired. After determining that user 110A may have a need for the product, physical needs tool 105 may send a recommendation of the product to user 110A, as message 192. In certain embodiments, message 192 may contain a link to purchase the product from an online retailer. In certain embodiments, after receiving message 192, user 110A may send a purchase request 197 to physical needs tool 105. Physical needs tool 105 may then complete the purchase for user 110A, instructing the online retailer to send the product to the location where the user will be on the future date. In certain other embodiments, after receiving message 192, user 110A may purchase the product directly from the online retailer, through merchant server 190. In this manner, certain embodiments help to provide for a user's physical needs by helping to ensure that the user is equipped with functioning products designed to provide for the user's safety and/or comfort during various weather conditions that the user may encounter.

Devices 115 may be used by users 110A through 110C to receive messages 192 from physical needs tool 105 and to send purchase requests 197 to merchant servers 190 and/or physical needs tool 105. Messages 192 may include recommendations of products for which physical needs tool 105 has determined that a user 110A may have a need. In certain embodiments, messages 192 may include links which the user may follow to purchase the products from online retailers, through merchant servers 190. In some embodiments, messages 192 may include links to instruct physical needs tool 105 to purchase the products on behalf of the user from merchant servers 190. In certain embodiments, purchase requests 197 may include payment information belonging to user 110A. In certain embodiments, devices 115 may communicate with physical needs tool 105 through network 125 via a web interface.

Devices 115 include any appropriate device for communicating with components of system 100 over network 125. For example, devices 115 may be a telephone, a mobile phone, a computer, a laptop, a tablet, a server and/or an automated assistant. This disclosure contemplates devices 115 being any appropriate device for sending and receiving communications over network 125. As an example, and not by way of limitation, device 115 may be a computer, a laptop, a wireless or cellular telephone, an electronic notebook, a personal digital assistant, a tablet, or any other device capable of receiving, processing, storing, and/or communicating information with other components of system 100. Device 115 may also include a user interface, such as a display, a microphone, keypad, or other appropriate terminal equipment usable by user 110. In some embodiments, an application executed by device 115 may perform the functions described herein.

Network 125 facilitates communication between and amongst the various components of system 100. This disclosure contemplates network 125 being any suitable network operable to facilitate communication between the components of system 100. Network 125 may include any interconnecting system capable of transmitting audio, video, signals, data, messages, or any combination of the preceding. Network 125 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

First database 130 may store a set of purchase histories 140. Each of purchase histories 140A through 140C may be assigned to a user 110A through 110C. This disclosure contemplates that purchase histories 140A through 140C may include records of purchases made by users 110A through 110C. In certain embodiments, these records of purchases may include lists of products purchased by users 110A through 110C, as well as the dates that the purchases were made. In some embodiments, the records of purchases additionally include the locations of the users at the times they made the purchases.

This disclosure contemplates that purchase histories 140A through 140C may be obtained in any suitable manner. For example, in certain embodiments, users 110A through 110C may provide physical needs tool 105 with access to applications installed on devices 115A through 115C that are used by users 110A through 110C to purchase products and/or services. As another example, in certain embodiments, users 110A through 110C may provide physical needs tool 105 with access to their banking information. As a further example, in certain embodiments, users 110A through 110C may allow physical needs tool 105 to track their online activities.

In certain embodiments, system 100 may additionally include second database 135. Second database 135 may store a set of location data 145 and a set of historical weather data 150. The set of location data 145 may include subsets of location data 145A through 145C. Each subset of location data 145A through 145C may be assigned to a user 110A through 110C. This disclosure contemplates that subsets of location data 145A through 145C may indicate the locations of users 110A through 110C over time. For example, location data 145A through 145C may each contain a list of locations and dates, each date indicating when the given user 110A through 110C was at the associated location. This disclosure contemplates that location data 145A through 145C may be obtained in any suitable manner. For example, in certain embodiments, physical needs tool 105 may obtain location data 145A by monitoring the GPS location of one or more devices 115A belonging to user 110A. In some embodiments, physical needs tool 105 may obtain location data 145A from purchase history 140A. For example, physical needs tool 105 may determine that user 110A was in Colorado from May 5, 2019 to May 12, 2019, based on a record of a plane ticket purchased by user 110A for travel to Colorado on May 5, 2019, returning on May 12, 2019.

The set of historical weather data 150 may include records of the weather conditions at the locations stored in location data 145 over time. For example, historical weather data 150 may include records of the weather conditions in Colorado from May 5, 2019 to May 12, 2019. This disclosure contemplates that historical weather data 150 may be obtained in any suitable manner. For example, in certain embodiments, physical needs tool 105 may obtain historical weather data 150 from an external weather monitoring/prediction service, such as one provided by weather server 185. In some embodiments, physical needs tool 105 may obtain historical weather data 150 from devices 115A through 115C. For example, in certain embodiments, users 110A through 110C may provide physical needs tool 105 with access to weather applications installed on their devices 115A through 115C. This disclosure contemplates that in certain embodiments, these weather applications may use the GPS locations of mobile devices 115 to determine the weather at user 110's location, which physical needs tool 105 may then access. In other embodiments, physical needs tool 105 may provide these weather applications with the GPS locations of devices 115 and receive the weather at these GPS locations from the applications.

This disclosure contemplates that, in certain embodiments, physical needs tool 105 may use location data 145, historical weather data 150, and purchase histories 140 to determine sets of products that users 110A through 110C tend to purchase during particular weather conditions. For example, in certain embodiments, physical needs tool 105 may determine that a positive correlation exists between demand for a product (as determined from purchase histories 140) and the presence of a weather condition at the time a user purchased the product (as determined from location data 145 and historical weather data 150). This process is described in further detail below, in the discussion of product predictor 175.

As seen in FIG. 1, physical needs tool 105 includes processor 155, memory 160, location predictor 170, product predictor 175, and physical needs predictor 180. This disclosure contemplates processor 155 and memory 160 being configured to perform any of the functions of physical needs tool 105 described herein. Generally, physical needs tool 105 implements location predictor 170 to determine user 110A's likely locations at future dates. Physical needs tool 105 also implements product predictor 175 to obtain weather forecasts for these likely locations on the future dates, and to determine sets of products typically purchased by other users 110B through 110C during categories of weather that include the forecasted weather conditions. Physical needs tool 105 further implements physical needs predictor 180 to determine whether user 110A may have a need for any of the products of the sets of products typically purchased by other users during categories of weather that include the forecasted weather conditions, based on purchase history 140A of user 110A. If physical needs predictor 180 determines that user 110A has a need for one or more of the products, physical needs predictor 180 may send a recommendation of the product to user 110A as message 192. In certain embodiments, physical needs predictor 180 may additionally receive a purchase request 197 from user 110A and complete a purchase of the product on behalf of user 110A. In this manner, certain embodiments of physical needs tool 105 may help to ensure that user 110A is equipped with products designed to provide for the user's safety, comfort, and/or other physical needs during various weather conditions that the user may encounter.

Location predictor 170 may determine future locations where a user 110A may likely be located, based on the user's purchase history 140A. For example, in certain embodiments, location predictor 170 may search user 110A's purchase history 140A to determine purchase records associated with travel at future dates. For example, location predictor 170 may search user 110A's purchase history 140A for records associated with plane/train/bus tickets for future travel, hotel bookings for future stays, upcoming car rentals, and/or any other purchase records indicating that user 110A may be travelling from a first location to a second location on a first date and/or returning to the first location from the second location on a second date. This disclosure contemplates that in certain embodiments, location predictor 170 may include a machine learning algorithm trained to identify travel purchases from a set of purchase records that includes a variety of different types of purchases.

Once location predictor 170 has identified purchase records associated with future travel of user 110A, location predictor 170 may extract the locations and dates of this travel from these records. In certain embodiments, location predictor 170 may use multiple records to extract the locations of future travel for a given range of dates. For example, in certain embodiments, location predictor 170 may use a first purchase record of a flight from a first location to a second location on a first date and from the second location back to the first location on a second date to determine that user 110A will likely be located in the second location for a period of time from the first date to the second date. Location predictor 170 may then refine this information using a second purchase record of a hotel room booked in a third location, different from the second location, for a period time from a third date to a fourth date, the third date and the fourth date falling between the first date and the second date, to determine that user 110A will likely be located in the second location from the first date to the third date, in the third location from the third date to the fourth date, and back in the second location from the fourth date to the second date. In certain embodiments, location predictor 170 may store the predicted locations and dates in location data 145A. In some embodiments, location predictor 170 may send these locations and dates to product predictor 175.

Location predictor 170 may be a software module stored in memory 160 and executed by processor 155. An example algorithm for location predictor 170 is as follows: access purchase history 140A; search purchase history 140A for purchase records associated with travel; for each purchase record associated with travel: {identify a first location assigned to a first date; identify a second location assigned to a second date, the second date later than the first date; determine that the second date is a date in the future; send the first location and a date range from the first date to the second date to product predictor 175, as predicted location information for user 110A}.

Product predictor 175 has two main purposes: (1) to determine sets of products typically purchased by users 110A through 110C during various categories of weather conditions 165; and (2) to obtain weather forecasts for the locations and dates predicted by location predictor 170 and to use these forecasts to locate those sets of products previously determined by product predictor 175 to typically be purchased by users 110A through 110C during categories of weather 165 that include the forecasted weather conditions.

Regarding the first purpose, product predictor 175 may operate on purchase histories 140, sets of location data 145, and historical weather data 150 to determine sets of products typically purchased by users 110A through 110C during different categories of weather 165, stored in memory 160. This disclosure contemplates that each weather category 165A through 165M may include one or more weather conditions. For example, in some embodiments, a first weather category may include temperatures below negative thirty degrees Celsius, with minimal winds, as well as temperatures between negative twenty and negative thirty degrees Celsius, with strong winds. As another example, a second weather category may include temperatures above forty degrees Celsius with low humidity levels, as well as temperatures between thirty and forty degrees Celsius with high humidity levels. This disclosure contemplates that in certain embodiments, weather categories 165 may be provided to physical needs tool 105 by a system administrator. In other embodiments, product predictor 175 may determine weather categories 165A through 165M of the set of weather categories 165 using purchase histories 140, location data 145, and historical weather data 150. For example, in certain embodiments, product predictor 175 may assign a first weather condition and a second weather condition to a first weather category 165A, based on a determination that both weather conditions are associated with a rise in user demand (as determined from purchase histories 140) for the same, or substantially the same set of products. This disclosure contemplates that a first set of products and a second set of products may be substantially the same, if 75% or more of the products in the first set of products are also included in the second set of products. This disclosure further contemplates that memory 160 may contain any number of weather categories 165A through 165M.

Once weather categories 165 have been stored in memory 160 (either by a system administrator or by product predictor 175), product predictor 175 next assigns groups of products to each of weather categories 165A through 165M. This disclosure contemplates that product predictor 175 may assign products to weather categories 165A through 165M in any suitable manner, such that each weather category 165A through 165M contains a set of products that a user 110A may wish to purchase during at least one of the weather conditions assigned to the weather category.

As an example, in certain embodiments, product predictor 175 may assign products to each of weather categories 165A through 165M by determining products for which a positive correlation exists between user demand for the product, and a presence of at least one of the weather conditions assigned to the weather category at the given location and on the given date that the product was purchased. For example, product predictor 175 may search purchase histories 140 to locate records of product purchases made by each user 110, where each record includes not only the product purchased by user 110, but also the date the purchase was made. Product predictor 175 may then use sets of location data 145 to determine, for each product purchased by a user 110, the location of the user on the date the user purchased the product. Product predictor 175 may then access historical weather data 150 to determine a weather condition at the location that the user purchased the product on the date that the user purchased the product. Product predictor 175 may then use this information to determine if a positive correlation exists between user demand for the product and a presence of at least one weather condition assigned to a given weather category 165 on the date and at the location where the product was purchased.

As another example, in certain embodiments, product predictor 175 may assign products to each of weather categories 165A through 165M by using a machine learning algorithm trained to identify products and to assign the products to one or more weather categories 165. For example, the machine learning algorithm may be trained to operate on data stored in a database or located online, to extract products and associated weather conditions from the data. For instance, in certain embodiments, the machine learning algorithm may be trained to identify a weather condition from a photograph and to additionally identify products located in the photograph to assign to a weather category 165 containing the identified weather condition. For example, the machine learning algorithm may be able to determine that a picture of an individual shoveling his/her sidewalk is associated with a "heavy snow" weather condition, and may be able to identify a snow shovel, a winter jacket, a pair of winter boots, and a pair of gloves from the photo. As a result, the machine learning algorithm may assign the snow shovel, the winter jacket, the pair of winter boots, and the pair of gloves to a "heavy snow" weather category.

Product predictor 175 may be a software module stored in memory 160 and executed by processor 155. An example algorithm for the first purpose of product predictor 175 is as follows: for each purchase history 140A through 140N: {for each record stored in the purchase history: {determine if the record corresponds to the purchase of a product; if the record corresponds to the purchase of a product: {determine the date that the purchase was made; identify the location of the user who made the purchase on the date that the purchase was made, using location data 145; identify a weather condition at the location of the purchase and on the date the purchase was made, using historical weather data 150}}}; use the identified products and corresponding weather conditions to determine if a positive correlation exists between user demand for the product and a given weather condition; if a positive correlation exists between user demand for the product and the given weather condition: {identify a weather category of the set of weather categories 165 that includes the given weather condition; assign the product to the weather category}.

Regarding the second purpose of product predictor 175, once product predictor 175 has assigned sets of products to weather categories 165, product predictor 175 may then use weather categories 175 to determine products for which a user 110A may have a future need. This disclosure contemplates that a user 110A may have a future need for a given product, if the user is expected to experience future weather conditions assigned to one or more weather categories 165 that contain the product. Accordingly, product predictor 175 first determines those weather conditions that a user 110A is expected to experience in the future, based on the predicted locations of the user on future dates, as determined by location predictor 170. This disclosure contemplates that product predictor 175 may determine a predicted weather condition for a predicted location of user 110A on a future date in any appropriate manner. For example, in certain embodiments, product predictor 175 may send the predicted location and date to an external weather server 185 to obtain a weather forecast for that predicted location and date. This disclosure contemplates that weather server 185 may be any component connected to network 125 and capable of providing physical needs tool 105 with a prediction of a weather condition at a given location, on a given date.

Once product predictor 175 has determined a future weather condition that user 110A is likely to face, product predictor 175 then determines a set of products for which user 110A may have a future need, by identifying a weather category 165A through 165M of the set of weather categories 165 to which the future weather condition is assigned. Product predictor 175 may then provide physical needs predictor 180 with the set of products assigned to the identified weather category. For example, product predictor 175 may determine that user 110A is likely to experience a snow storm with the potential to bring three feet of snow. Product predictor 175 may then determine that this weather condition belongs to the "heavy snow" weather category. Accordingly, product predictor 175 may provide physical needs predictor 180 with a list of products that is stored in the "heavy snow" weather category. This list of products may include a snow shovel, a winter jacket, a pair of winter boots, and a pair of gloves.

An example algorithm for the second purpose of product predictor 175 is as follows: receive predicted location of the user on future dates from location predictor 170; for each predicted location and date: {send the predicted location and date to external weather server 185; receive a forecasted weather condition for the predicted location and date; identify a weather category of the set of weather categories 165 to which the forecasted weather condition belongs; send the set of products assigned to the identified weather category to physical needs predictor 180}.

Physical needs predictor 180 receives the set of products identified by product predictor 175 as those typically purchased during (or otherwise associated with) a weather condition that user 110A is predicted to likely experience at a future date. Physical needs predictor 180 may then predict the likelihood that user 110A has a need for one or more of the products of this set of products. This disclosure contemplates that physical needs predictor 180 may predict the likelihood that user 110A has a need for one or more of the products of the set of products in any appropriate manner. As an example, in certain embodiments, physical needs predictor 180 may predict a probability that user 110A has a need for one of the products of the set of products, based on purchase history 140A of user 110A. Physical needs predictor 180 may then predict that user 110A likely has a need for the product by determining that this probability is greater than a threshold. For example, physical needs predictor 180 may predict a probability that a user 110A has a need for a given product by determining that purchase history 140A assigned to user 110A does not include a record of user 110A purchasing the product. In certain such embodiments, physical needs predictor 180 may set the probability to 100%, in response to determining that purchase history 140A does not include a record or user 110A purchasing the product. In other such embodiments, the probability predicted by physical needs predictor 180 may depend on one or more factors, such as the quantity of information relating to user 110A's past purchases to which physical needs tool 105 has access. For example, in response to determining that a first purchase history 140A assigned to user 110A does not include a record of user 110A purchasing the product and that a second purchase history 140B assigned to user 110B does not include a record of user 110B purchasing the product, physical needs predictor 180 may assign a higher probability that user 110A has a need for the product than the probability that user 110B has a need for the product, based on the fact that user 110A has granted physical needs tool 105 access to multiple shopping applications, his/her banking records, and his/her web browser, while user 110B has only granted physical needs tool 105 access to a single shopping application, suggesting that purchase history 140A is more complete than purchase history 140B. As another example, the probability predicted by physical needs predictor 180 may depend on whether the predicted location of user 110A is a home location or a travel location. For example, physical needs predictor 180 may assign a higher probability that user 110A has a need for a snow shovel at a given location, when the location corresponds to user 110A's home, as compared to when the location corresponds to a vacation destination. In certain embodiments, physical needs predictor 175 may distinguish between user 110A's home location and vacation locations based on historical GPS locations of user 110A's device 115A.

In certain embodiments, when purchase history 140A assigned to user 110A does in fact include a record of user 110A purchasing the given product, physical needs predictor 180 may nevertheless determine that user 110A has a need for the product based on a determination that the product purchased by user 110A is likely expired. This disclosure contemplates that physical needs predictor 180 may determine that the product purchased by user 110A is likely expired in any appropriate manner. As an example, in certain embodiments, physical needs predictor 180 may determine that the product purchased by user 110A is likely expired based on purchase histories 140B through 140N. For example, physical needs predictor 180 may determine that purchase history 140B contains a first record of the product purchased by user 110B on a first date as well as a second record of the product purchased by user 110B on a second date. Physical needs predictor 180 may then use the time interval between the first date and the second date to determine a useful life of the product. For example, physical needs predictor 180 may determine a set of such time intervals, based on records of purchases of the product in purchase histories 140B through 140N, and determine a useful life of the product by calculating the average of the set of such time intervals. Physical needs predictor 180 may then determine that user 110A likely has a need for the product if the time since user 110A last purchased the product is greater than the determined useful life of the product.

In certain embodiments, physical needs predictor 180 may adjust the determine useful life of the product based on a number of different factors. As an example, in certain embodiments, physical needs predictor 180 may increase the useful life of the product based on a determination that the historical weather experiences by user 110A (as determined from location data 145A and historical weather data 150) was such that user 110A likely underutilized the purchased product, as compared with an average user. For example, in certain embodiments, physical needs predictor 180 may increase the determined useful life of a snow shovel based on a determination that user 110A experienced substantially less snowfall that the average snowfall for the country while owning the purchased snow shovel. As another example, in certain embodiments, physical needs predictor 180 may adjust the determined useful life of the product based on a quality of the product. For example, in certain embodiments, physical needs predictor 180 may decrease the determined useful life of a plastic snow shovel based on a determination that a plastic shovel is of a low quality and will likely break sooner than an average snow shovel.

Once physical needs predictor 180 has determined that a user 110A likely has a need for a product, physical needs predictor 180 may next send a recommendation of the product to user 110A, as message 192. In certain embodiments, message 192 may include a link through which user 110A may purchase the product. In some embodiments, message 192 may include multiple recommendations of different versions of the product. For example, if physical needs predictor 180 determines that user 110A has a need for a winter jacket, message 192 may include recommendations of several different styles of winter jackets. In certain embodiments, physical needs predictor 180 may select a subset of versions of the product from all available versions of the product, based on user 110A's purchase history 140A. For example, in certain embodiments, physical needs predictor 180 may use a machine learning algorithm trained to identify versions of products that align with a given user's style. As an example, purchase history 140A may include a large amount of pink clothing. Accordingly, the machine learning algorithm may determine that user 110A prefers pink clothing, and accordingly identify pink winter jackets for inclusion in message 192. In this manner, physical needs tool 105 may save considerable bandwidth and processing resources that may otherwise be expended by a user searching for suitable versions of the product.

In certain embodiments, message 192 may contain a link through which user 110A may purchase a product directly from merchant server 190. In such embodiments, user 110A may send a purchase request 197 directly to merchant server 190. In other embodiments, message 192 may contain a link through which user 110A may instruct physical needs tool 105 to purchase the product from merchant server 190 on the user's behalf. In such embodiments, user 110A may send a purchase request 197 to physical needs tool 105 that includes the user's banking information and/or permission for physical needs tool 105 to access the user's banking information. Physical needs tool 105 may then purchase the product from merchant server 190 by supplying merchant server 190 with the user's purchase information and instructing the merchant to send the product to the user's future location, where physical needs predictor 180 has determined that user 110A will likely have a need for the product. This disclosure contemplates that merchant server 190 may be any component connected to physical needs tool 105 and/or devices 115 through network 125 that is capable of receiving purchase requests 197 for products and processing these purchase requests, such that in response to receiving and processing a purchase request 197 for a given product from a user 110A (or from physical needs tool 105 on behalf of user 110A), a merchant associated with merchant server 190 may send the product to a location specified for user 110A.

Physical needs predictor 180 may be a software module stored in memory 160 and executed by processor 155. An example algorithm for physical needs predictor 180 is as follows: receive the set of products identified by product predictor 175 as products frequently purchased during a weather condition that user 110A is likely to experience at a future date; for each product of the set of products: {determine whether purchase history 140A, assigned to user 110A, includes a record of the product purchased by user 110A; if purchase history 140A does not include a record of the product: {determine the probability that user 110A has a need for the product; if the probability that user 110A has a need for the product is greater than a first threshold: provide user 110A with a recommendation of the product in message 192}; if purchase history 140A does include a record of the product: {determine the probability that the product purchased by user 110A is expired; if the probability that the product purchased by user 110A is expired is greater than a second threshold: provide user 110A with a recommendation of the product in message 192}; receive a purchase request 197 from user 110A; complete the purchase(s) on behalf of user 110A.

Processor 155 is any electronic circuitry, including, but not limited to microprocessors, application specific integrated circuits (ASIC), application specific instruction set processor (ASIP), and/or state machines, that communicatively couples to memory 160 and controls the operation of physical needs tool 105. Processor 155 may be 8-bit, 16-bit, 32-bit, 64-bit or of any other suitable architecture. Processor 155 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 155 may include other hardware and software that operates to control and process information. Processor 155 executes software stored on memory to perform any of the functions described herein. Processor 155 controls the operation and administration of physical needs tool 105 by processing information received from network 125, devices 115, and memory 160. Processor 155 may be a programmable logic device, a microcontroller, a microprocessor, any suitable processing device, or any suitable combination of the preceding. Processor 155 is not limited to a single processing device and may encompass multiple processing devices.

Memory 160 may store, either permanently or temporarily, data, operational software, or other information for processor 155. Memory 160 may include any one or a combination of volatile or non-volatile local or remote devices suitable for storing information. For example, memory 160 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 160, a disk, a CD, or a flash drive. In particular embodiments, the software may include an application executable by processor 155 to perform one or more of the functions described herein. In certain embodiments, memory 160 may also store weather categories 165. Each weather category 165A through 165M of weather categories 165 may be assigned one or more weather conditions and may contain one or more products that are frequently purchased during the one or more weather conditions, as described above, in the discussion of product predictor 175.

In certain embodiments, physical needs tool 105 may leverage data stored in purchase histories 140 in order to help provide for the user's physical needs. Specifically, physical needs tool 105 may help to ensure that a user is equipped with functioning products designed to provide for the user's safety and/or comfort during various weather conditions that the user may encounter. Helping to ensuring that the user is equipped with such products may help protect the user from serious injury and even death. In this manner, physical needs tool 105 may help to provide for the safety of a user 110A while the user is travelling to locations that may be subject to weather conditions that the user may otherwise not have been prepared for. Additionally, physical needs tool 105 may save considerable bandwidth and processing resources that may otherwise be expended by a user searching for suitable versions of needed products.

Modifications, additions, or omissions may be made to the systems described herein without departing from the scope of the invention. For example, system 100 may include any number of users 110, devices 115, networks 125, first databases 130, second databases 135, weather servers 185, and merchant servers 190. The components may be integrated or separated. Moreover, the operations may be performed by more, fewer, or other components. Additionally, the operations may be performed using any suitable logic comprising software, hardware, and/or other logic.

Figure 2:
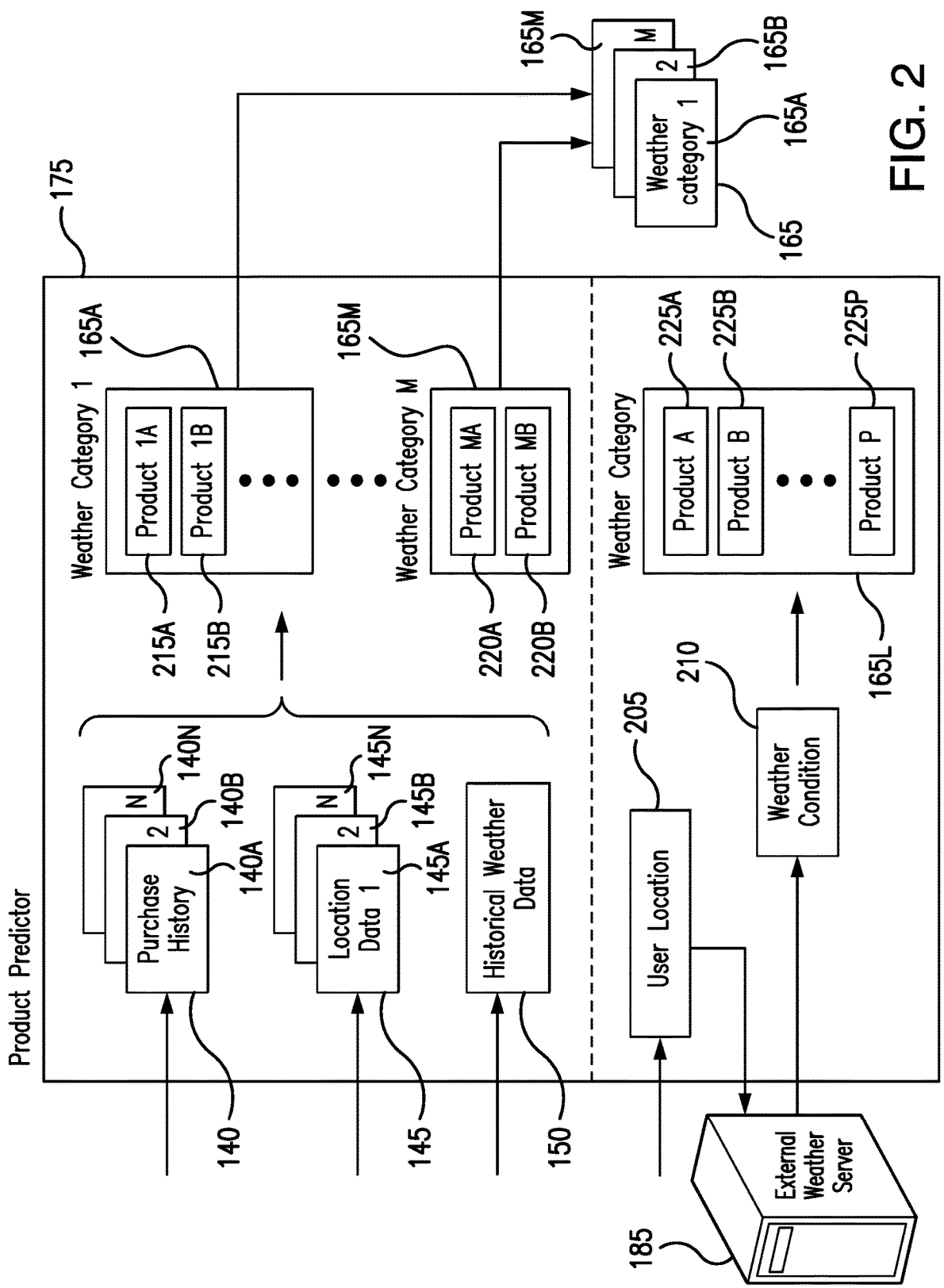
FIG. 2 illustrates the product predictor of the physical needs tool of the system of FIG. 1.

FIG. 2 illustrates product predictor 175 of physical needs tool 105. This disclosure contemplates that product predictor 175 has two main purpose: (1) to determine sets of products typically purchased by users 110A through 110C during various categories of weather conditions 165, as illustrated in first component 175A of product predictor 175; and (2) to obtain weather forecasts for the locations and dates predicted by location predictor 170, and to use these forecasts to locate those sets of products previously determined by product predictor 175 to typically be purchased by users 110A through 110C during categories of weather 165 that include the forecasted weather conditions, as illustrated by second component 175B of product predictor 175.

As illustrated in FIG. 2, first component 175A of product predictor 175 may operate on purchase histories 140, sets of location data 145, and historical weather data 150 to determine sets of products typically purchased by users 110A through 110C during different weather categories 165. This disclosure contemplates that each weather category 165A through 165M may include one or more weather conditions. For example, in some embodiments, a first weather category may include temperatures below negative thirty degrees Celsius, with minimal winds, as well as temperatures between negative twenty and negative thirty degrees Celsius, with strong winds. As another example, a second weather category may include temperatures above forty degrees Celsius with low humidity levels, as well as temperatures between thirty and forty degrees Celsius with high humidity levels. This disclosure contemplates that in certain embodiments, weather categories 165 may be provided to physical needs tool 105 by a system administrator. In other embodiments, the first component 175A of product predictor 175 may determine the set of weather categories 165 using purchase histories 140, location data 145, and historical weather data 150. For example, in certain embodiments, product predictor 175 may assign a first weather condition and a second weather condition to a first weather category 165A, based on a determination that both weather conditions are associated with a rise in user demand (as determined from purchase histories 140) for the same, or substantially the same set of products. This disclosure contemplates that a first set of products and a second set of products may be substantially the same if 75% or more of the products in the first set of products are also included in the second set of products.

Once the set of weather categories 165 has been stored in memory 160 (either by a system administrator or by product predictor 175), product predictor 175 next assigns groups of products to each weather category 165A through 165M of the set of weather categories 165. For example, product predictor 175 may assign first product 215A and second product 215B to first weather category 165A. Product predictor 175 may also assign third product 220A and fourth product 220B to M-th weather category 165M. This disclosure contemplates that product predictor 175 may assign products to weather categories 165A through 165M in any suitable manner, such that each weather category 165A through 165M contains a set of products that a user 110A may wish to purchase during at least one of the weather conditions assigned to the weather category.

As an example, in certain embodiments, product predictor 175 may assign products to each weather category 165A through 165M by determining products for which a positive correlation exists between user demand for each product, and a presence of at least one of the weather conditions assigned to the weather category at the given location and on the given date that the product was purchased. For example, product predictor 175 may search purchase histories 140 to locate records of product purchases made each user 110, where each record includes not only the product purchased by user 110, but also the date the purchase was made. Product predictor 175 may then use sets of location data 145 to determine, for each product purchased by a user 110, the location of the user on the date that the user purchased the product. Product predictor 175 may then access historical weather data 150 to determine a weather condition at the location the user purchased the product on the date the user purchased the product. Product predictor 175 may then use this information to determine if a positive correlation exists between user demand for the product and a presence of at least one weather condition assigned to a given weather category 165 on the date and at the location that the product was purchased.

As another example, in certain embodiments, product predictor 175 may assign products to each weather category 165A through 165M by using a machine learning algorithm trained to identify products and assign the products to one or more weather categories 165. For example, the machine learning algorithm may be trained to operate on data stored in a database or located online, to extract products and associated weather conditions from the data. For instance, in certain embodiments, the machine learning algorithm may be trained to identify a weather condition from a photograph and to subsequently identify products located in the photograph. For example, the machine learning algorithm may be able to determine that a picture of an individual shoveling his/her sidewalk is associated with a weather condition of heavy snow, and may be able to identify a snow shovel, a winter jacket, a pair of winter boots, and a pair of gloves from the photo. As a result, the machine learning algorithm may assign the snow shovel, the winter jacket, the pair of winter boots, and the pair of gloves to a "heavy snow" weather category.

Regarding the second purpose of product predictor 175, once product predictor 175 has assigned sets of products to weather categories 165, the second component 175B of product predictor 175 may then use weather categories 165 to determine products for which a user 110A may have a future need. This disclosure contemplates that a user 110A may have a future need for a given product, if the user is expected to experience future weather conditions assigned to one or more weather categories 165 that contain the product. Accordingly, product predictor 175 first determines those weather conditions that a user 110A is expected to experience in the future, based on the predicted locations of the user on future dates, as determined by location predictor 170. This disclosure contemplates that product predictor 175 may determine a predicted weather condition for a predicted location of user 110A on a future date in any appropriate manner. For example, in certain embodiments, product predictor 175 may send the predicted location and date to an external weather server 185 to obtain the weather forecasted for that predicted location and date. For example, as illustrated in FIG. 2, product predictor 175 may obtain predicted weather condition 210 from external weather server 185 after sending after sending a predicted future location and date 205 of user 110A to external weather server 186.

Once product predictor 175 has determined a future weather condition 201 that user 110A is likely to face, product predictor 175 then determines a set of products for which user 110A may have a future need, by identifying a weather category 165L of the set of weather categories 165 to which the future weather condition 210 is assigned. Product predictor 175 may then provide physical needs predictor 180 with the set of products 225A through 225P assigned to the identified weather category 165L. For example, product predictor 175 may determine that user 110A is likely to experience a snow storm with the potential to bring three feet of snow with it. Product predictor 175 may then determine that this weather condition belongs to the "heavy snow" weather category. Accordingly, product predictor 175 may provide physical needs predictor 180 with a list of products that is stored in the "heavy snow" weather category. This list of products may include a snow shovel, a winter jacket, a pair of winter boots, and a pair of gloves.

Figure 3:
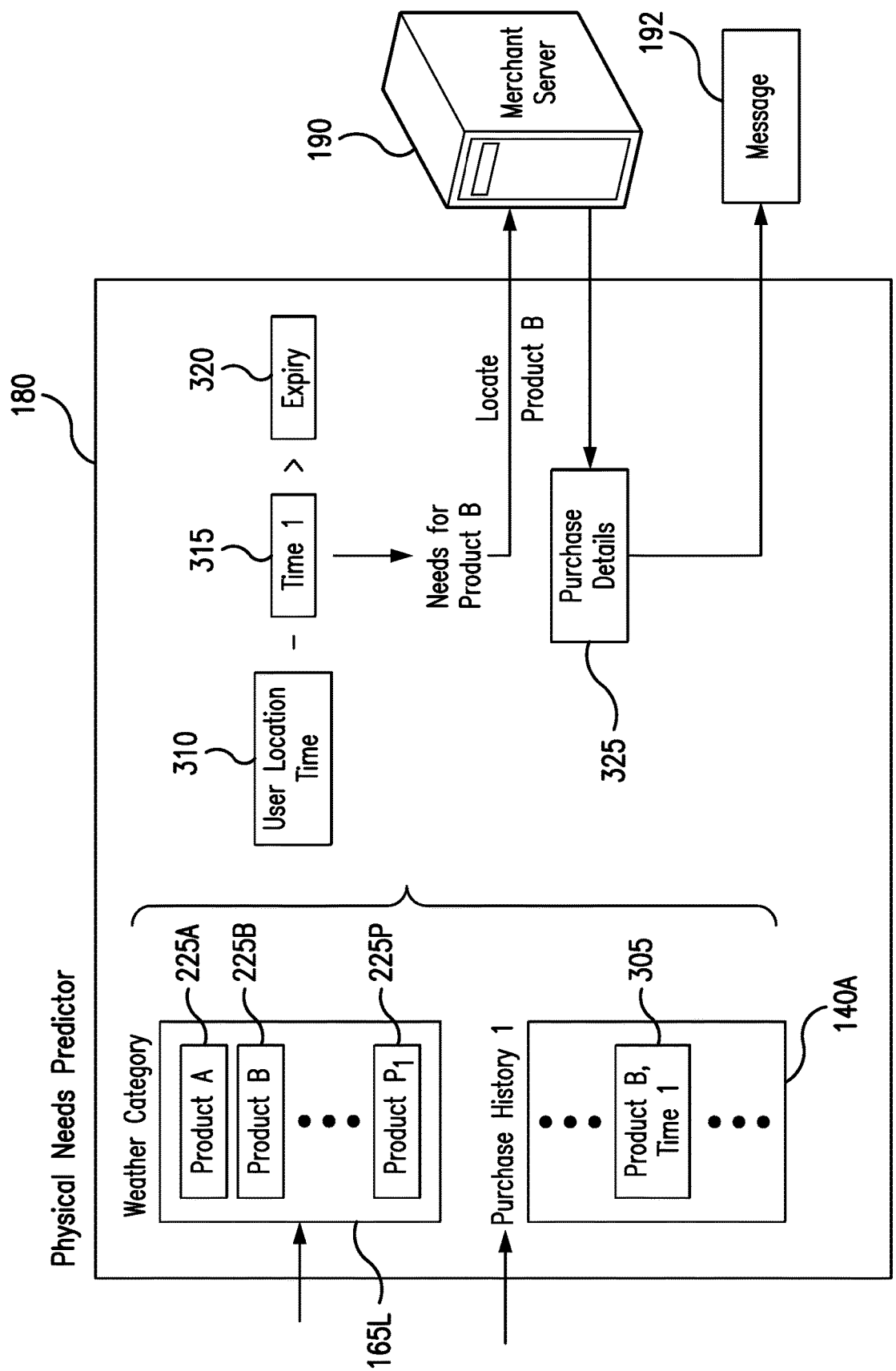
FIG. 3 illustrates the physical needs predictor of the physical needs tool of the system of FIG. 1.

FIG. 3 illustrates physical needs predictor 180 of physical needs tool 105. Physical needs predictor 180 receives the set of products 225A through 225P identified by product predictor 175 as those typically purchased during (or otherwise associated with) a weather condition that user 110A is predicted to likely experience at a future date. Physical needs predictor 180 may then predict the likelihood that user 110A has a need for one or more of products 225A through 225P. This disclosure contemplates that physical needs predictor 180 may predict the likelihood that user 110A has a need for one or more of products 225A through 225P in any appropriate manner. As an example, in certain embodiments, physical needs predictor 180 may predict a probability that user 110A has a need for one of the products of the set of products, based on purchase history 140A of user 110A. Physical needs predictor 180 may then predict that user 110A likely has a need for the product by determining that this probability is greater than a threshold. For example, as illustrated in FIG. 3, physical needs predictor 180 may determine that user 110A has a need for a given product based on a determination that, while purchase history 140A assigned to user 110A contains a record 305 of the product purchased by user 110A, the product purchased by user 110A is likely expired. This disclosure contemplates that physical needs predictor 180 may determine that the product purchased by user 110A is likely expired in any appropriate manner. As an example, in certain embodiments, physical needs predictor 180 may determine that the product purchased by user 110A is likely expired based on purchase histories 140B through 140N. For example, physical needs predictor 180 may determine that purchase history 140B contains a first record of the product purchased by user 110B on a first date as well as a second record of the product purchased by user 110B on a second date. Physical needs predictor 180 may then use the time interval between the first date and the second date to determine a useful life 320 of the product. For example, physical needs predictor 180 may determine a set of such time intervals, based on records of purchases of the product in purchase histories 140B through 140N, and determine a useful life 320 of the product by calculating the average of the set of such time intervals. Physical needs predictor 180 may then determine that user 110A likely has a need for the product if the time interval measured between the time 310 that location predictor 170 has determined that user 110A is likely to be in the predicted location and the time 315 that user 110A last purchased the product is greater than the determined useful life 320 of the product.

In certain embodiments, physical needs predictor 180 may adjust the determine useful life 320 of the product based on a number of different factors. As an example, in certain embodiments, physical needs predictor 180 may increase the useful life of the product based on a determination that the historical weather experienced by user 110A (as determined from location data 145A and historical weather data 150) was such that user 110A likely underutilized the purchased product, as compared with an average user. For example, in certain embodiments, physical needs predictor 180 may increase the determined useful life of a snow shovel based on a determination that user 110A experienced substantially less snowfall that the average snowfall for the country while owning the purchased snow shovel. As another example, in certain embodiments, physical needs predictor 180 may adjust the determined useful life 320 of the product based on a quality of the product. For example, in certain embodiments, physical needs predictor 180 may decrease the determined useful life 320 of a plastic snow shovel based on a determination that a plastic shovel is of a low quality and will likely break sooner than an average snow shovel.

Once physical needs predictor 180 has determined that a user 110A likely has a need for a product, physical needs predictor 180 may next locate one or more versions of the product for purchase on one or more merchant servers 190. Physical needs predictor 180 may then send a recommendation of the product, including details of the product 325, to user 110A, as message 192. In certain embodiments, message 192 may include a link through which user 110A may purchase the product. In some embodiments, message 192 may include multiple recommendations of different versions of the product. For example, if physical needs predictor 180 determines that user 110A has a need for a winter jacket, message 192 may include recommendations of several different styles of winter jackets. In certain embodiments, physical needs predictor 180 may select a subset of versions of the product from all available versions of the product, based on user 110A's purchase history 140A. For example, in certain embodiments, physical needs predictor 180 may use a machine learning algorithm trained to identify versions of products that align with a given user's style. As an example, purchase history 140A may include a large amount of pink clothing. Accordingly, the machine learning algorithm may determine that user 110A prefers pink clothing, and accordingly identify pink winter jackets for inclusion in message 192.

In certain embodiments, message 192 may contain a link through which user 110A may purchase a product directly from merchant server 190. In such embodiments, user 110A may send a purchase request 197 directly to merchant server 190. In other embodiments, message 192 may contain a link through which user 110A may instruct physical needs tool 105 to purchase the product from merchant server 190 on the user's behalf. In such embodiments, user 110A may send a purchase request 197 to physical needs tool 105 that includes the user's banking information and/or permission for physical needs tool 105 to access the user's banking information. Physical needs tool 105 may then purchase the product from merchant server 190 by supplying merchant server 190 with the user's purchase information and instructing the merchant to send the product to the user's future location, where physical needs predictor 180 has determined that user 110A will likely have a need for the product. This disclosure contemplates that merchant server 190 may be any component connected to physical needs tool 105 and/or devices 115 through network 125 that is capable of receiving purchase requests 197 for products and processing these purchase requests, such that in response to receiving and processing a purchase request 197 for a given product from a user 110A (or from physical needs tool 105 on behalf of user 110A), a merchant associated with merchant server 190 may send the product to a location specified for user 110A.

Figure 4:
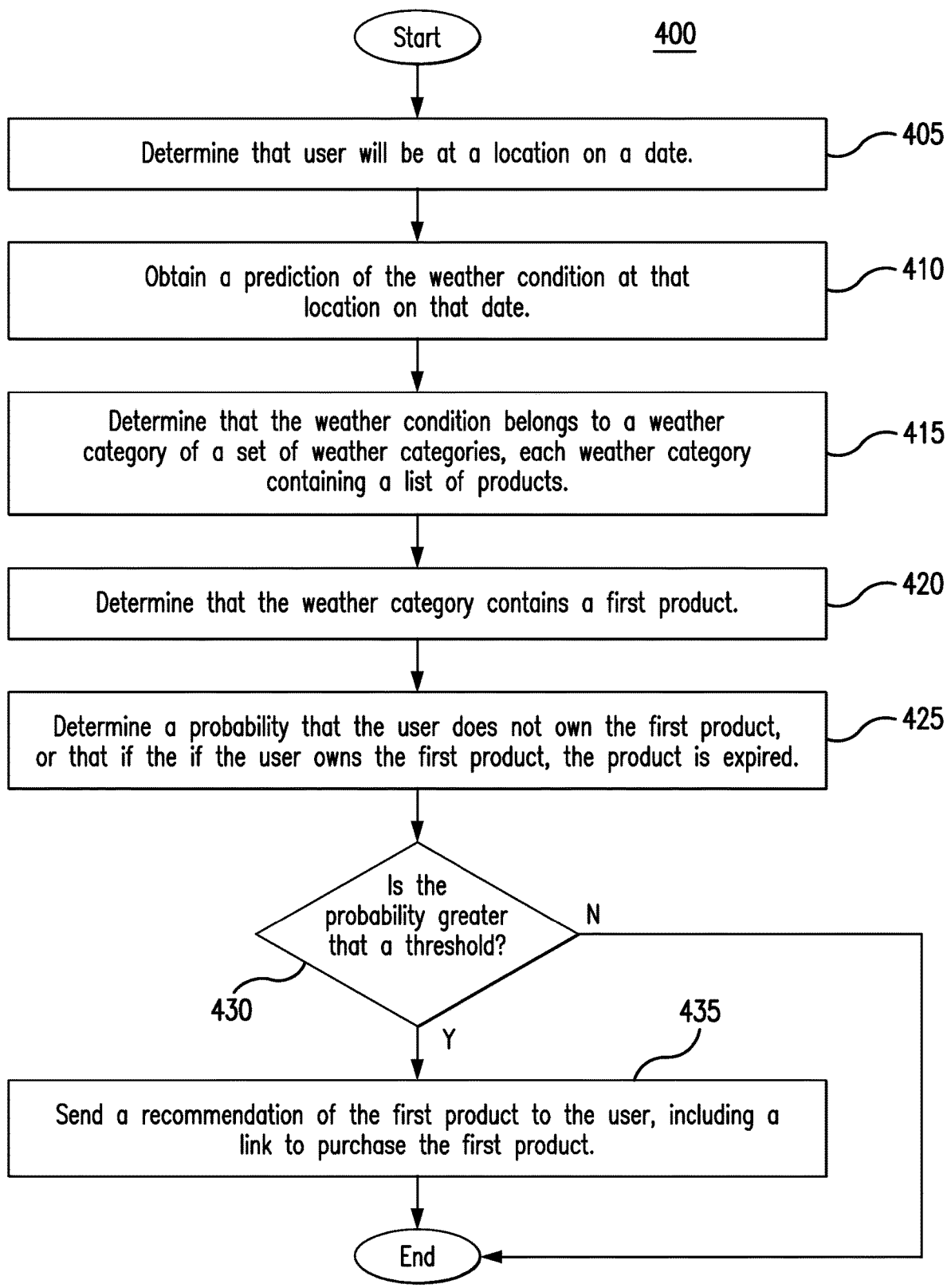
FIG. 4 presents a flowchart illustrating the process by which a processor of the physical needs tool of the system of FIG. 1 determines that a user may have a need for a product, based on a weather forecast at a future location of the user.

FIG. 4 presents a flowchart further illustrating the process by physical needs tool 105 determines that a user may have a need for a product, based on a weather forecast at a likely future location of the user. In step 405, physical needs tool 105 determines that user 110A will be at a given location, on a given date. For example, in certain embodiments, physical needs tool 105 determines that user 110A will be at the given location, on the given date based on travel details stored as a record in purchase history 140A, assigned to user 110A.

In step 410, physical needs tool 105 obtains a prediction of a weather condition at the given location, on the given date. For example, in certain embodiments, physical needs tool 105 provides the given location and the given date to weather server 185 and, in response, receives a weather forecast for the given location and the given date from weather server 185. In step 415, physical needs tool 105 determines that the received weather condition belongs to a weather category of a set of weather categories 165. Here, each weather category 165A through 165M of the set of weather categories 165 is assigned to one or more weather conditions and contains one or more products. This disclosure contemplates that, in certain embodiments, the one or more products assigned to a given weather category are products for which a positive correlation exists between consumer demand for each product, and a presence of at least one of the one or more weather conditions assigned to the weather category at a given location and on a given date that the product was purchased.

In step 420, physical needs tool 105 determines that the weather category contains a first product. Next, in step 425, physical needs tool 105 determines a probability that user 110A does not own the first product, or that if user 110A does own the first product, the product is expired. In certain embodiments, physical needs tool 105 determines the probability that user 110A does not own the first product based on a determination that purchase history 140A, assigned to first user 110A, does not include a first record of the first product purchased by the user. In some embodiments, physical needs tool 105 determines the probability that user 110A does not own the first product based on a determination that while purchase history 140A, assigned to user 110A does contain a first record of the first product purchased by user 110A, the first product is nevertheless likely expired.

In step 430, physical needs tool 105 determines whether the probability that user 110A does not own a purchased first product that is not expired is greater than a threshold. If, in step 430, physical needs tool 105 determines that the probability that user 110A does not own a purchased first product that is not expired is greater than the threshold, in step 435 physical needs tool 105 sends a recommendation of the first product to user 110A, as message 192. In certain embodiments, message 192 may contain a link through which user 110A may purchase the first product.

Modifications, additions, or omissions may be made to method 400 depicted in FIG. 4. Method 400 may include more, fewer, or other steps. For example, steps may be performed in parallel or in any suitable order. While discussed as physical needs tool 105 (or components thereof) performing the steps, any suitable component of system 100, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:
1. An apparatus comprising:
a database configured to store a first purchase history assigned to a first user, the first purchase history comprising:
one or more records of products purchased by the first user; and
a record of a ticket purchased by the first user, the ticket for travel from a first location to a second location on a first date and from the second location back to the first location on a second date;
a memory configured to store a set of weather categories, each weather category of the set of weather categories assigned to one or more weather conditions and storing one or more identifications of products, the set of weather categories comprising a first weather category assigned to a first weather condition, the first weather category storing an identification of a first product, wherein:
the first product comprises a physical product designed for use during the first weather condition;
a first photograph depicted the first product and the first weather condition; and
the identification of the first product was stored in the first weather category in response to a first machine learning algorithm identifying both the first product and the first weather condition in the first photograph; and
a hardware processor communicatively coupled to the memory, the processor configured to:
determine, based on the first purchase history assigned to the first user, that the first user will be in the second location on a third date;
in response to determining that the first user will be in the second location on the third date:
obtain a prediction of the first weather condition at the second location on the third date;
determine that the first weather condition is assigned to the first weather category;
determine, based on the one or more records of products purchased by the first user, a probability that the first user has a need for the first product, wherein determining the probability that the first user has the need for the first product comprises at least one of:
determining that the first purchase history of the first user does not comprise a first record of the first product purchased by the first user; and
determining that the first purchase history of the first user does comprise the first record of the first product purchased by the first user and determining a second probability that the purchased first product is expired;
determine that the probability that the first user has the need for the first product is greater than a threshold;
in response to determining that the probability is greater than the threshold:

identify a plurality of versions of the first product comprising:
  a first version of the first product available from a first online retailer; and
  a second version of the first product available from a second online retailer;
apply a second machine learning algorithm to the plurality of versions of the first product to select the first version of the first product, the second machine learning algorithm trained, based on the first purchase history of the first user, to determine that the first user is more likely to purchase the first version of the first product than the second version of the first product; and
send a recommendation of the first version of the first product to the first user, the recommendation comprising a link to purchase the first version of the first product from the first online retailer;
in response to sending the recommendation of the first version of the first product to the first user, receive a response from the first user, the response comprising a purchase request; and
in response to receiving the response, complete a purchase of the first version of the first product for the first user.

2. The apparatus of claim 1, wherein determining the second probability that the purchased first product is expired comprises:
  determining a fourth date that the first user purchased the first product;
  determining a first time interval between the third date and the fourth date; and
  determining that the first time interval is greater than an expected life of the first product.

3. The apparatus of claim 2, wherein:
  the database is further configured to store a second purchase history assigned to a second user, the second purchase history comprising a second record of the first product purchased by the second user and a third record of the first product purchased by the second user, the second record indicating that the second user purchased the first product on a fifth date, the third record indicating that the second user purchased the first product on a sixth date, the sixth date later than the fifth date; and
  the expected life of the first product is determined based in part on a second time interval between the sixth date and the fifth date.

4. The apparatus of claim 1, wherein completing the purchase of the first version of the first product for the first user comprises providing the first online retailer with payment information of the first user and providing the first online retailer with the second location, wherein in response to receiving the payment information and the second location, the first online retailer ships the first version of the first product to the second location.

5. The apparatus of claim 1, wherein the first machine learning algorithm was trained to identify both the first product and the first weather condition in the first photograph based on a plurality of photographs stored in a second database.

6. The apparatus of claim 1, wherein the processor is further configured to:
  determine a third version of the first product; and
  determine, based on the one or more records of products purchased by the first user, that the first user is more likely to purchase the first version of the first product than the third version of the first product, and that the first user is more likely to purchase the second version of the first product than the third version of the first product.

7. The apparatus of claim 1, further comprising a second database configured to store:
  location data comprising locations of the first user, a second user, and a third user over time;
  historical weather data comprising weather conditions at the locations of the first user, the second user, and the third user over time, wherein the first database is further configured to store:
    a second purchase history assigned to the second user, the second purchase history comprising one or more records of products purchased by the second user; and
    a third purchase history assigned to the third user, the third purchase history comprising one or more records of products purchased by the third user; and
  the processor is further configured to assign, based in part on the first purchase history, the second purchase history, the third purchase history, the location data, and the historical weather data, a second product to a second weather category of the one or more weather categories.

8. A method comprising:
locating a record of a ticket purchased by a first user in a first purchase history assigned to the first user, the first purchase history comprising:
  one or more records of products purchased by the first user; and
  the record of the ticket purchased by the first user, the ticket for travel from a first location to a second location on a first date and from the second location back to the first location on a second date;
determining, based on the record of the ticket, that the first user will be in the second location on a third date;
in response to determining that the first user will be in the second location on the third date:
  obtaining a prediction of a first weather condition at the second location on the third date;
  determining that the first weather condition is assigned to a first weather category of a set of weather categories, each weather category of the set of weather categories assigned to one or more weather conditions and storing one or more identifications of products, the first weather category storing an identification of a first product, wherein:
    the first product comprises a physical product designed for use during the first weather condition;
    a first photograph depicted the first product and the first weather condition; and
    the identification of the first product was stored in the first weather category in response to a first machine learning algorithm identifying both the first product and the first weather condition in the first photograph;
  determining, based on the one or more records of products purchased by the first user, a probability that the first user has a need for the first product, wherein determining the probability that the first user has the need for the first product comprises at least one of:
    determining that the first purchase history of the first user does not comprise a first record of the first product purchased by the first user; and determining that the first purchase history of the first user does comprise the first record of the first product purchased by the first user and determining a second probability that the purchased first product is expired;

determining that the probability that the first user has the need for the first product is greater than a threshold;

in response to determining that the probability is greater than the threshold:

identifying a plurality of versions of the first product comprising:

a first version of the first product available from a first online retailer; and a second version of the first product available from a second online retailer;

applying a second machine learning algorithm to the plurality of versions of the first product to select the first version of the first product, the second machine learning algorithm trained, based on the first purchase history of the first user, to determine that the first user is more likely to purchase the first version of the first product than the second version of the first product; and sending a recommendation of the first version of the first product to the first user, the recommendation comprising a link to purchase the first version of the first product from the first online retailer;

in response to sending the recommendation of the first version of the first product to the first user, receiving a response from the first user, the response comprising a purchase request; and in response to receiving the response, completing a purchase of the first version of the first product for the first user.

9. The method of claim 8, wherein determining the second probability that the purchased first product is expired comprises:

determining a fourth date that the first user purchased the first product;

determining a first time interval between the third date and the fourth date; and determining that the first time interval is greater than an expected life of the first product.

10. The method of claim 9, wherein:

a second user purchased the first product on a fifth date;

the second user purchased the first product on a sixth date, the sixth date greater than the fifth date; and the expected life of the first product is determined based in part on a second time interval between the sixth date and the fifth date.

11. The method of claim 8, wherein completing the purchase of the first version of the first product for the first user comprises providing the first online retailer with payment information of the first user and providing the first online retailer with the second location, wherein in response to receiving the payment information and the second location, the first online retailer ships the first version of the first product to the second location.

12. The method of claim 8, wherein the first machine learning algorithm was trained to identify both the first product and the first weather condition in the first photograph based on a plurality of photographs stored in a second database.

13. The method of claim 8, further comprising:

determining a third version of the first product; and determining, based on the one or more records of products purchased by the first user, that the first user is more likely to purchase the first version of the first product than the third version of the first product, and that the first user is more likely to purchase the second version of the first product than the third version of the first product.

14. The method of claim 8, further comprising assigning, based in part on the first purchase history, a second purchase history, a third purchase history, location data, and historical weather data, a second product to a second weather category of the one or more weather categories, wherein:

the second purchase history is assigned to a second user and comprises one or more records of products purchased by the second user;

the third purchase history is assigned to a third user and comprises one or more records of products purchased by the third user;

the location data comprises locations of the first user, the second user, and the third user over time; and the historical weather data comprises weather conditions at the locations of the first user, the second user, and the third user over time.

15. A system comprising:

a first storage element operable to store a first purchase history assigned to a first user, the first purchase history comprising:

one or more records of products purchased by the first user; and a record of a ticket purchased by the first user, the ticket for travel from a first location to a second location on a first date and from the second location back to the first location on a second date;

a second storage element operable to store a set of weather categories, each weather category of the set of weather categories assigned to one or more weather conditions and storing one or more identifications of products, the set of weather categories comprising a first weather category assigned to a first weather condition, the first weather category storing an identification of a first product, wherein:

the first product comprises a physical product designed for use during the first weather condition;

a first photograph depicted the first product and the first weather condition; and the identification of the first product was stored in the first weather category in response to a first machine learning algorithm identifying both the first product and the first weather condition in the first photograph; and a processing element communicatively coupled to the storage element, the processing element operable to:

determine, based on the first purchase history assigned to the first user, that the first user will be in the second location on a third date;

in response to determining that the first user will be in the second location on the third date:

obtain a prediction of the first weather condition at the second location on the third date;

determine that the first weather condition is assigned to the first weather category;

determine, based on the one or more records of products purchased by the first user, a probability that the first user has a need for the first product, wherein determining the probability that the first user has the need for the first product comprises at least one of:

determining that the first purchase history of the first user does not comprise a first record of the first product purchased by the first user; and determining that the first purchase history of the first user does comprise the first record of the first product purchased by the first user and determining a second probability that the purchased first product is expired;

determine that the probability that the first user has the need for the first product is greater than a threshold;

in response to determining that the probability is greater than the threshold:

identify a plurality of versions of the first product comprising:

a first version of the first product available from a first online retailer; and a second version of the first product available from a second online retailer;

apply a second machine learning algorithm to the plurality of versions of the first product to select the first version of the first product, the second machine learning algorithm trained, based on the first purchase history of the first user, to determine that the first user is more likely to purchase the first version of the first product than the second version of the first product; and send a recommendation of the first version of the first product to the first user, the recommendation comprising a link to purchase the first version of the first product from the first online retailer;

in response to sending the recommendation of the first version of the first product to the first user, receive a response from the first user, the response comprising a purchase request; and in response to receiving the response, complete a purchase of the first version of the first product for the user, wherein completing the purchase of the first version of the first product for the first user comprises providing the first online retailer with payment information of the first user and the second location, wherein in response to receiving the payment information and the second location the first online retailer ships the first version of the first product to the second location.

16. The system of claim 15, wherein determining the second probability that the purchased first product is expired comprises:

determining a fourth date that the first user purchased the first product;

determining a first time interval between the third date and the fourth date; and determining that the first time interval is greater than an expected life of the first product.

17. The system of claim 16, wherein:

the first storage element is further operable to store a second purchase history assigned to a second user, the second purchase history comprising a second record of the first product purchased by the second user and a third record of the first product purchased by the second user, the second record indicating that the second user purchased the first product on a fifth date, the third record indicating that the second user purchased the first product on a sixth date, the sixth date later than the fifth date; and the expected life of the first product is determined based in part on a second time interval between the sixth date and the fifth date.

18. The system of claim 15, wherein the first machine learning algorithm was trained to identify both the first product and the first weather condition in the first photograph based on a plurality of photographs stored in a second database.

19. The system of claim 15, wherein the processing element is further operable to:

determine a third version of the first product; and determine, based on the one or more records of products purchased by the first user, that the first user is more likely to purchase the first version of the first product than the third version of the first product, and that the first user is more likely to purchase the second version of the first product than the third version of the first product.

20. The system of claim 15, further comprising a third storage element operable to store:

location data comprising locations of the first user, a second user, and a third user over time;

historical weather data comprising weather conditions at the locations of the first user, the second user, and the third user over time, wherein the first storage element is further operable to store:

a second purchase history assigned to the second user, the second purchase history comprising one or more records of products purchased by the second user; and a third purchase history assigned to the third user, the third purchase history comprising one or more records of products purchased by the third user; and the processing element is further operable to assign, based in part on the first purchase history, the second purchase history, the third purchase history, the location data, and the historical weather data, a second product to a second weather category of the one or more weather categories.

* * * * *